(12) United States Patent
Favaretto

(10) Patent No.: US 12,252,041 B2
(45) Date of Patent: Mar. 18, 2025

(54) VEHICLE WITH MOVABLE DRIVER'S STATION

(71) Applicant: FERRARI S.P.A., Modena (IT)

(72) Inventor: Fabrizio Favaretto, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 18/360,494

(22) Filed: Jul. 27, 2023

(65) Prior Publication Data

US 2024/0034198 A1 Feb. 1, 2024

(30) Foreign Application Priority Data

Jul. 29, 2022 (IT) .......................... 102022000016149

(51) Int. Cl.
| | | |
|---|---|---|
| B60N 2/07 | (2006.01) | |
| B60K 26/02 | (2006.01) | |
| B60R 1/02 | (2006.01) | |
| B60T 7/06 | (2006.01) | |

(52) U.S. Cl.
CPC ............ B60N 2/0737 (2013.01); B60K 26/02 (2013.01); B60R 1/025 (2013.01); B60T 7/06 (2013.01); *B60K 2026/026* (2013.01)

(58) Field of Classification Search
CPC ...... B60N 2/062; B60N 2/0737; B60R 1/025; B60K 2026/026; B60K 26/02; B60T 7/06
USPC ..................................................... 296/65.11
See application file for complete search history.

(56) References Cited

U.S. PATENT DOCUMENTS

| | | | | |
|---|---|---|---|---|
| 11,110,821 B2 * | 9/2021 | Luchner | ................... | G05G 1/01 |
| 2003/0141736 A1 | 7/2003 | Chernoff | | |
| 2016/0176371 A1 * | 6/2016 | Coleman | ................. | B60R 1/025 |
| | | | | 701/49 |

FOREIGN PATENT DOCUMENTS

| | | | | | |
|---|---|---|---|---|---|
| CN | 105083059 A | * | 11/2015 | .......... | B60N 2/0232 |
| CN | 113602088 A | * | 11/2021 | | |
| DE | 102005005511 A1 | | 8/2006 | | |
| DE | 102007018744 A1 | | 8/2008 | | |
| DE | 102007062577 A1 | | 6/2009 | | |
| DE | 102007062581 A1 | * | 6/2009 | ............... | B60N 2/01 |

OTHER PUBLICATIONS

Mahler, CN-105083059-A, Machine Translation of Specification (Year: 2015).*
Dun, CN-113602088-A, Machine Translation of Specification (Year: 2021).*
Baumann, DE-102007062581-A1, Machine Translation of Specification (Year: 2009).*
Italian Search Report for Application No. 102022000016149, Filing Date: Jul. 29, 2022; Date of Mailing: Feb. 20, 2023, 6 pages.

* cited by examiner

*Primary Examiner* — Paul N Dickson
*Assistant Examiner* — Matthew Joseph Ganci
(74) *Attorney, Agent, or Firm* — CANTOR COLBURN LLP

(57) ABSTRACT

A vehicle comprising a body, a seat assembly comprising, in turn, a seat for a driver, and a guide coupled to the body and to the seat assembly so as to constrain the seat assembly relative to the body allowing for a translation movement of the seat assembly along a moving direction, characterized in that the moving direction is lateral relative to a driving direction of the vehicle.

11 Claims, 10 Drawing Sheets

VEHICLE WITH MOVABLE DRIVER'S STATION

CROSS-REFERENCE TO RELATED APPLICATIONS

This patent application claims priority from Italian patent application no. 102022000016149 filed on 29 Jul. 2022, the entire disclosure of which is incorporated herein by reference.

TECHNICAL FIELD

The invention relates to a vehicle, in particular a sports vehicle for use on the road and on the track.

PRIOR ART

In some vehicles, at least one of the seats, for example the driver's seat, can be adjusted or configured.

In particular, a user, i.e., the person who sits on the seat, can adjust the height of the seat vertically, the longitudinal position of the seat, as well as the respective inclinations of the backrest and base, i.e., the portion of the seat arranged to support the lower limbs of the user when seated.

In other vehicles, typically racing vehicles, the seat is completely fixed.

In general, there is a need to improve the adjustment or configurability of known seats.

One purpose of this invention is to satisfy at least one of the needs described above, preferably in a simple and reliable way.

DESCRIPTION OF THE INVENTION

The purpose is achieved with a motor vehicle as defined in claim 1.

The dependent claims define particular embodiments of the invention.

BRIEF DESCRIPTION OF THE DRAWINGS

Below, an embodiment of the invention will be described to better understand the same by way of non-limiting example and with reference to the attached drawings in which.

EMBODIMENTS OF THE INVENTION

Figure 1:
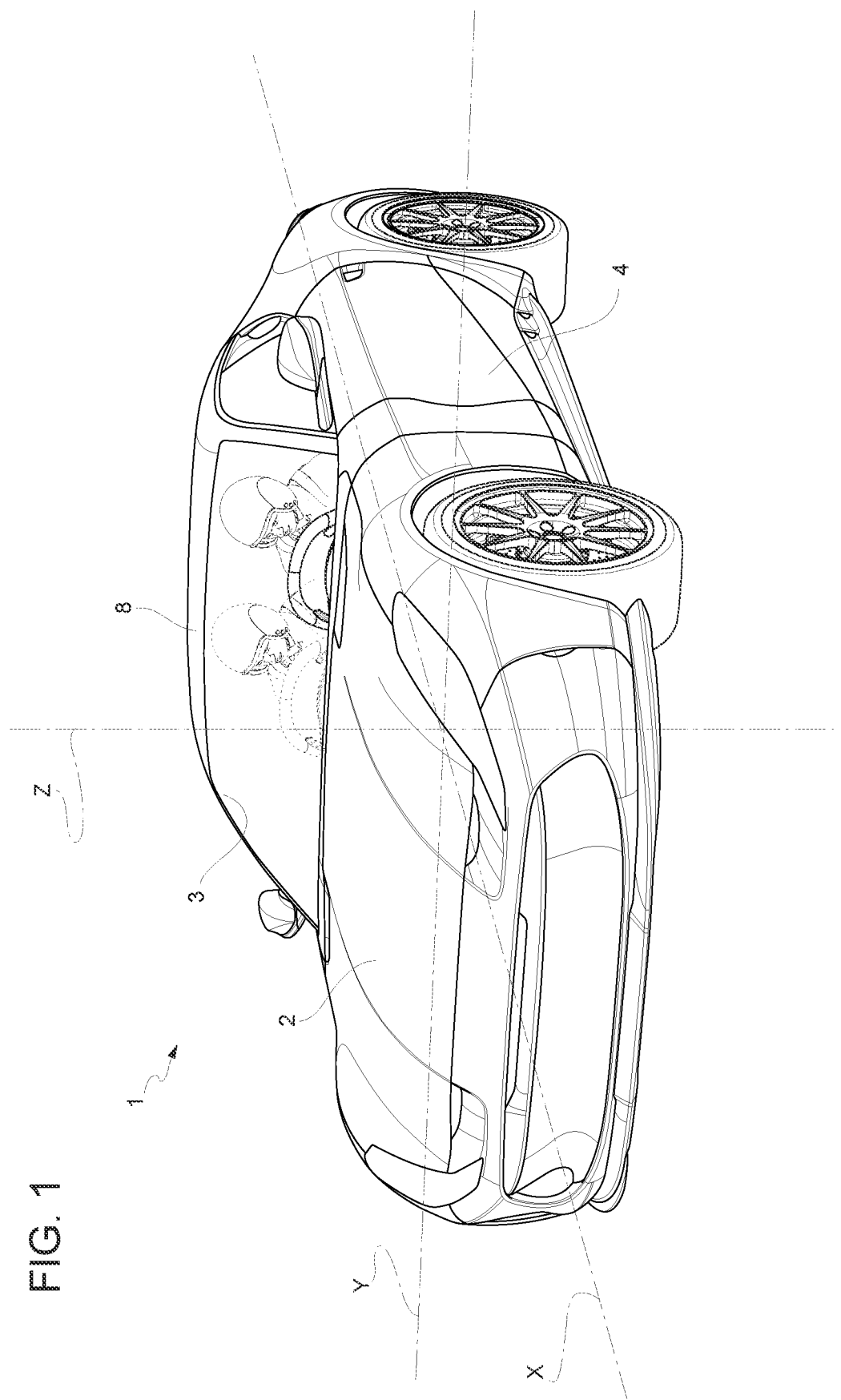
FIG. 1 is a perspective view of a vehicle according to the invention.

In FIG. 1, the reference number 1 is used to indicate, as a whole, a motor vehicle.

The vehicle 1 has a forward direction or longitudinal direction, indicated in FIG. 1 by an axis X, otherwise known as the roll axis of the vehicle 1.

The figures also illustrate another two axes Y, Z of the vehicle 1, otherwise known as the pitch axis and yaw axis of the vehicle 1.

The axis Y is a horizontal axis orthogonal to the forward direction of the vehicle 1, i.e., orthogonal to the axis X. The axis Z is orthogonal to the axes X, Y and has at least one vertical component. In general, the axis Z is orthogonal to the road plane the vehicle 1 travels along.

The vehicle 1 comprises a body 2 defining a passenger compartment 3.

As known, the body 2 includes the frame, understood as the structural part of the vehicle 1, and the bodywork, i.e., the part aesthetically visible from the outside of the vehicle 1.

In particular, the body 2 comprises a roof 8 and a floor 9, more specifically defining, respectively, an upper covering and a bottom of the passenger compartment 3.

In addition, the body 2 also comprises a side door 4 that can be selectively opened and closed to allow a driver to enter the passenger compartment 3 via a side opening defined by the body 2 and to close the latter opening respectively.

Figure 2:
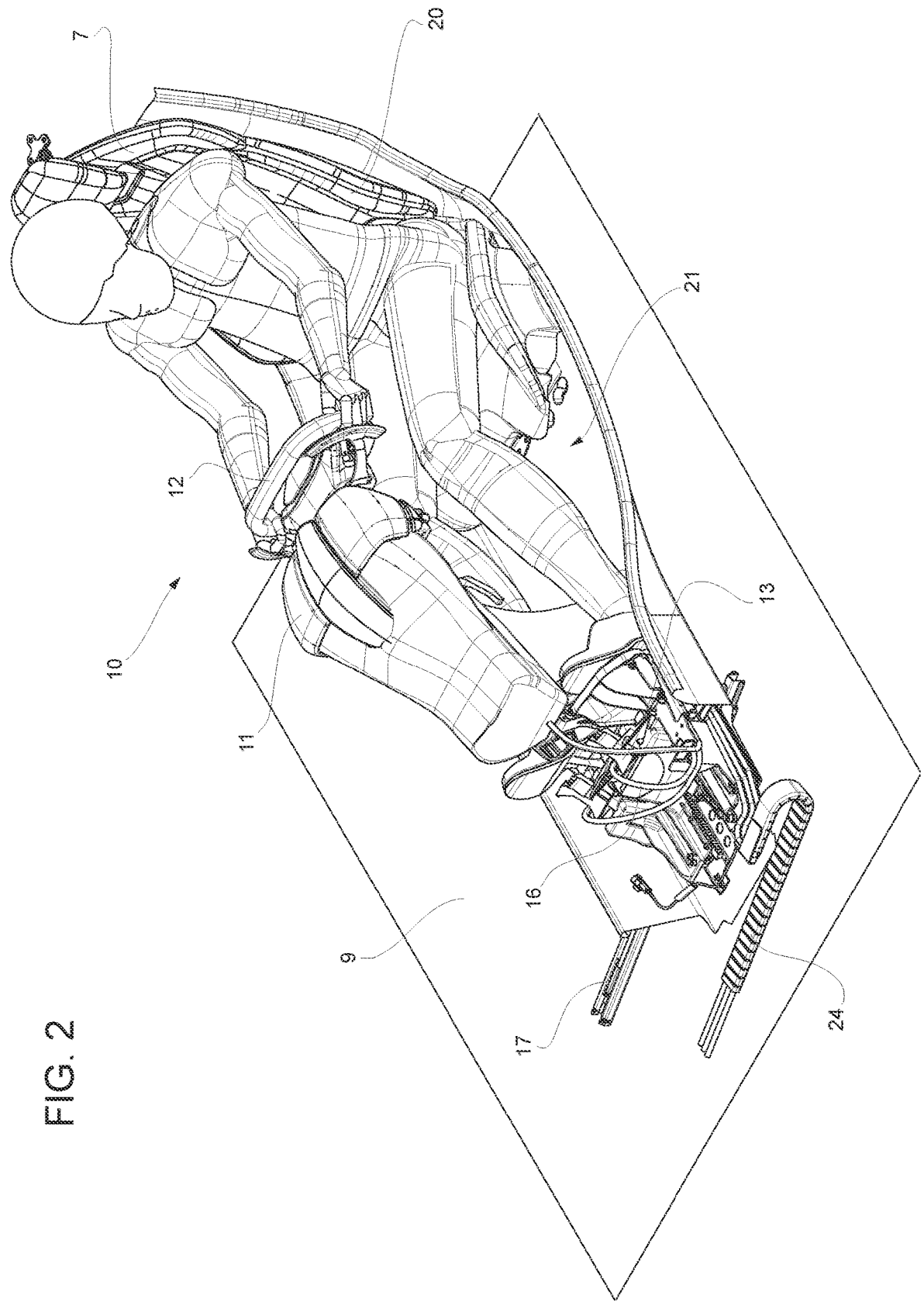
FIG. 2 is a perspective view, on an enlarged scale, of a seat assembly inside the passenger compartment of the vehicle in FIG. 1.
Figure 3:
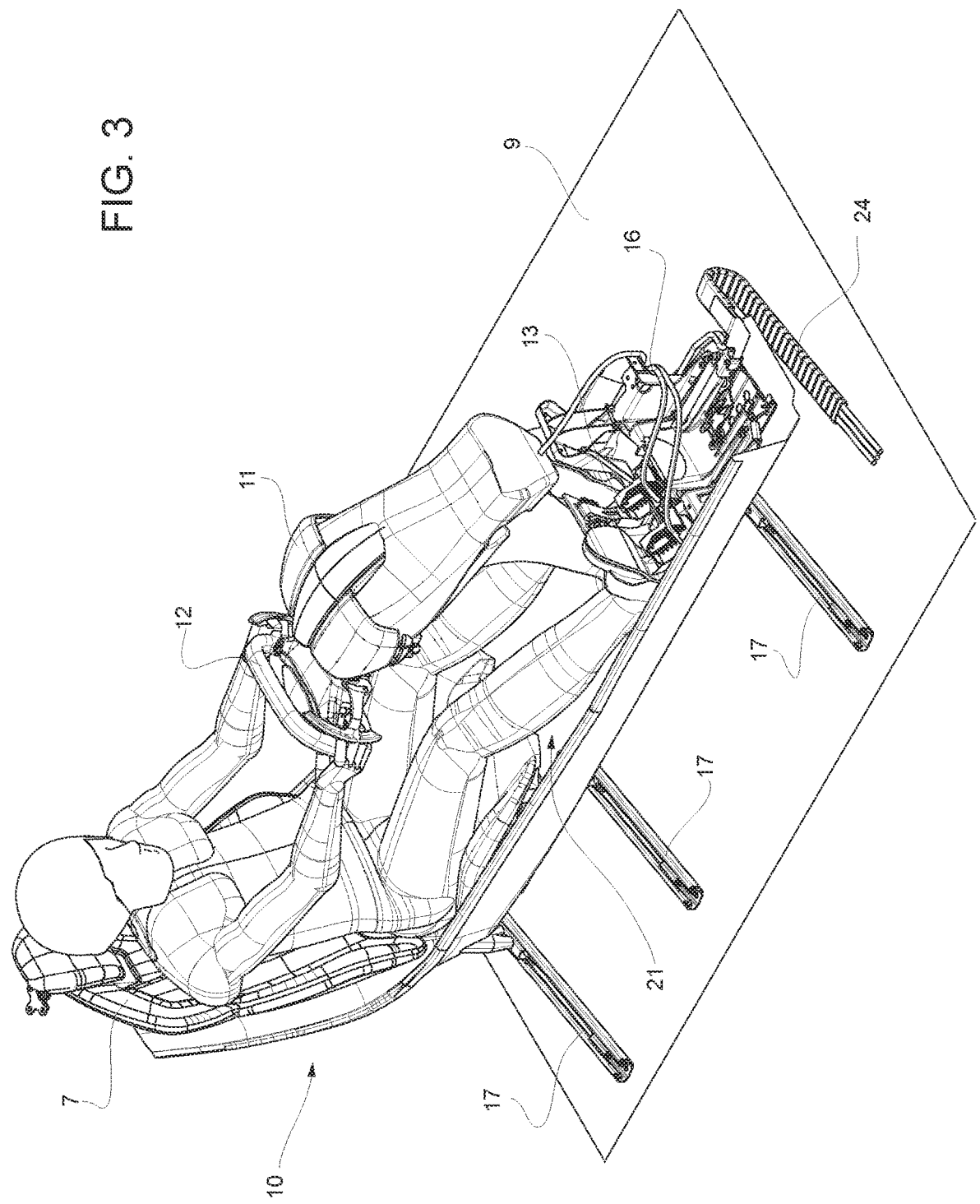
FIG. 3 shows the seat assembly in FIG. 2 according to an opposite perspective view compared to that in FIG. 2.

With reference to FIG. 2, inside the passenger compartment 3 the vehicle 1 comprises a station for a driver.

The vehicle 1 comprises a seat assembly 10 in the driver's station. The seat assembly 10 comprises at least one seat assembly 7 to accommodate the driver in a seated posture.

In the driver's station, the vehicle 1 comprises, in addition, in detail, a steering assembly 11, in particular including a steering wheel 12, to steer the vehicle and, independently or connected, a set of pedals 13 with at least two pedals 14, 15 to control the forward movement of the vehicle 1 according to the axis X.

In particular, the pedals 14, 15 are, respectively, a brake pedal and an accelerator pedal to control the braking and acceleration of the vehicle 1 according to the axis X, for example according to a continuous adjustment. Although the figures only show two pedals 14, 15, the set of pedals 13 could comprise an additional pedal, for example to control a clutch of the vehicle 1, in particular one provided with a manual gearbox. Similarly, one of the pedals 14, 15 could be absent with its function, for example, transferred to another type of control positioned elsewhere in the driver's station.

The steering assembly 11 and the set of pedals 13 could be configured to control the typical devices necessary for controlling the vehicle 1, for example, the wheel steering mechanism, the brakes, the propulsion assembly for transmitting power to the wheels, and the like, only using electric control signals, for example, thus forming a drive-by-wire system or by controlling servo actuators that are known in the sector, for example hydraulic ones. In any case, irrespective of the type of drive of the devices necessary for controlling the vehicle 1, both the steering assembly 11 and the set of pedals 13 may be connected, possibly independently of each other, to one or more of the necessary devices and/or to the servo actuators via electric and/or hydraulic connections 16, such as electric wires and/or hydraulic tubes, or, more generally, flexible electric and/or hydraulic connection elements. This is not, however, essential, since wireless connections could also be implemented instead of physical ones, according to variants not illustrated.

The driver's station can be moved laterally in relation to the axis X, i.e., with at least one component of movement transversal to the axis X.

In order to allow the movement of the driver's station, the vehicle 1 also comprises a guide device or, more simply, a guide 17 coupled to the body 2 and, more precisely, to the floor 9.

The guide 17 extends along a direction K and is configured to guide the components coupled to it along the direction K.

In this case, the guide 17 is a straight guide, so that the direction K is straight, although this is not essential. The direction K could also be curved, according to variants not illustrated.

The guide 17 is, preferably, fixed in relation to the body 2 and is, in particular, fastened to the floor 9, on which it extends in the direction K, in turn fixed in relation to the body 2 and, more precisely, to the floor 9. The direction K extends on the floor 9.

The direction K is lateral in relation to the axis X, i.e., it has at least one component transversal to the axis X. Preferably, the direction K is horizontal, i.e., it lies on the plane defined by the axes X, Y, i.e., it does not have components according to the axis Z, i.e., there is no component according to the axis Z of the direction K, in other words.

In particular, the direction K is oblique in relation to the axis X. Here, "oblique" means not parallel and not perpendicular.

The direction K comprises or is, more preferably, defined by a segment with two opposite ends. The expression "segment" is not limited to a straight segment, but also includes a curved segment, although, in the embodiment illustrated, the segment is straight.

With reference to the passenger compartment 3 of the vehicle 1 or to the axis X, for example, imagined as extending according to a longitudinal central axis of the vehicle 1, one of the ends of the segment has a position that is further forward and less off-centre, or more internal, compared to the other end.

The seat assembly 10 is coupled to the guide 17 and, as a result, constrained by the guide 17 in relation to the body 2 or, more precisely, relative to the floor 9.

More specifically, the seat assembly 10 is constrained to the body 2 or to the floor 9 with at least one degree of freedom of translation. In other words, the seat assembly 10 may have at least one translation movement along the direction K.

The guide 17 enables and guides the translation movement of the seat assembly 10 along the direction K.

The vehicle 1 preferably comprises an actuator assembly not illustrated, for example comprising known actuators, configured to perform translations of the seat assembly 10 in response to a user command, for example provided via one or more special controls not illustrated, for example a mobile phone, a remote control, a button accessible from the outside or inside of the vehicle 1, a lever accessible from the outside or inside of the vehicle 1, and the like. Each of the special controls can be part of the vehicle 1 or of a wider system including the vehicle 1, such as, for example, in the case of the remote control or mobile phone. Alternatively, the movements could be performed manually, without any loss of generality, for example with the aid of suitable mechanisms.

Conveniently, the seat assembly 10 comprises a slide 20 coupled to the guide 17 so it can move in the direction K.

The slide 20 is guided by the guide 17 along the direction K, so that it can translate in the same direction K.

The above-mentioned actuator assembly or the mechanisms suitable for moving the seat assembly 10 operate, preferably, on the slide 20, i.e., they are configured to translate the slide 20 along the direction K.

The slide 20 carries the seat 7, in particular in a fixed position. In other words, the seat 7 is fixed in relation to the slide 20. This is not strictly necessary, since the seat 7 could also, potentially, have its own mobility in relation to the slide 20, for example for adjustment requirements of the seat 7 configuration.

In the embodiment illustrated, the slide 20 has a concavity so that the slide 20 defines a cavity or housing 21 that accommodates at least a portion of the seat 7.

The cavity 21 preferably accommodates at least a portion of the steering assembly 11 and at least a portion of the set of pedals 13.

In particular, the steering assembly 11 and/or the set of pedals 13 are carried by the slide 20. In other words, the steering assembly 11 and/or the set of pedals 13 are coupled to the slide 20 so that they move along the direction K in response to a movement of the slide 20.

For example, a portion of the steering assembly 11, in particular including the column on which the steering wheel 12 is coupled in a rotatable manner around a steering axis, is fastened to the slide 20.

In this way, the driver's station is mobile along the direction K.

In particular, the driver's station or the seat 7 are mobile between two limit positions determined or defined by the guide 17.

In fact, using the guide 17, the seat assembly 10 or the seat 7 is mobile between the limit positions, of which one is further forward and less off-centre than the other, according to the axis X, in particular imagined as a central, longitudinal axis for the vehicle 1.

In one of the limit positions, the seat 7 is arranged next to the door 4 or basically in communication with the opening that can be opened and closed via the door 4, i.e., connected to the latter, so that the driver can enter the passenger compartment 3 sitting directly on the seat 7 while they pass through the opening. In other words, the seat 7 is basically adjacent to the opening connected to the door 4.

On the other hand, in the other limit position, the seat 7 is arranged in a more central position of the passenger compartment 3 or less off-centre according to the axis X.

In reality, in detail, the whole driver's station, including the steering assembly 11 and the set of pedals 13, move between the limit positions, so that the driver can guide the vehicle 1 from one off-centre, or more external, position as normally occurs for road vehicles, or from one more central, or more internal, position, as occurs for racing vehicles.

The mobility of the seat enables the driver to enter the passenger compartment 3 with the seat 7 in one of the limit positions and then move into a racing configuration, i.e., into the more central position, bringing the seat 7 into the other limit position.

The movement of the seat assembly 10 or of the seat 7, as, specifically, of the steering assembly 11 and/or of the set of pedals 13, is not blocked by the connections 16; rather, the same connections 16 are adapted to the movement, for example gathering up or extending, with the aid of known devices, such as typical cable-support chains 24, for example suitable for machine tools, with a known function and structure, so that they are not described in more detail.

The steering assembly 11 and/or the set of pedals 13 may be considered part of a more generic control assembly for guiding the vehicle 1. The control assembly comprises at least one base 25 carried by the slide 20.

In detail, the base 25 is part of the set of pedals 13. The pedals 14, 15 are, in particular, coupled to the base. According to one particular embodiment not illustrated, each of the pedals 14, 15 is coupled to the base 25 selectively translating according to the axis X, for example via respective guides and any locking devices that can be released and activated to lock the pedals 14, 15 in any possible position. In the latter case, the pedals 14, 15 are, preferably, mobile according to the axis X independently of each other. In other words, the respective positions of the pedals 14, 15 according to the axis X can be adjusted independently.

The base 25 is preferably coupled to the slide 20 so it is selectively mobile in relation to the slide 20 according to the axis X. Alternatively, the base 25 could also be fixed in relation to the slide 20.

More precisely, the base 25 may be translated, in detail along a straight direction, in particular one parallel to the axis X.

To guide the translation of the base 25, the seat assembly 10 comprises a guide 26 carried by the slide 20 in a fixed position in relation to the slide 20 and extending, in particular, along the direction of translation of the base 25.

In addition, the seat assembly 10 comprises one or more supports 26a coupled to the guide 26 so as to slide along the direction of translation of the base 25.

Figure 8:
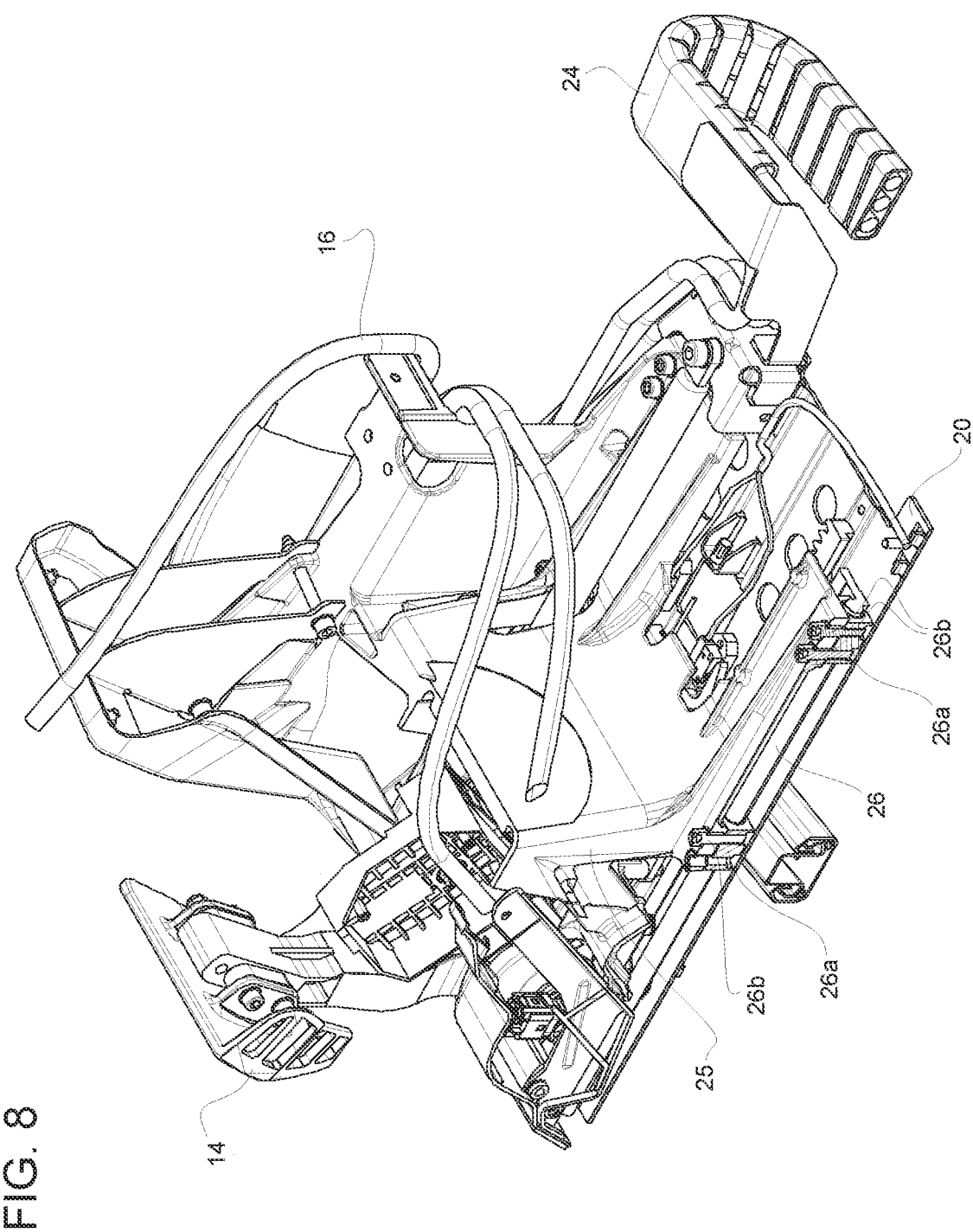
FIG. 8 is a perspective cross-section of the front portion in FIG. 6 according to a plane section indicated in FIG. 6 by the lines VIII-VIII.

The base 25 is carried by the supports 26a in a fixed position in relation to the supports 26a. In particular, the base 25 is fastened to the supports 26a, as can be seen in FIG. 8, in detail via mechanical connection elements 26b of the seat assembly 10, for example threaded elements, such as self-threading screws in blind holes made in the supports 26a.

The seat assembly 10 preferably comprises a control assembly 27 configured to control the movement of the base 25.

The control assembly 27 comprises a control unit 28 and an actuator device 29, for example an electric actuator, more precisely a linear one.

Figure 10:
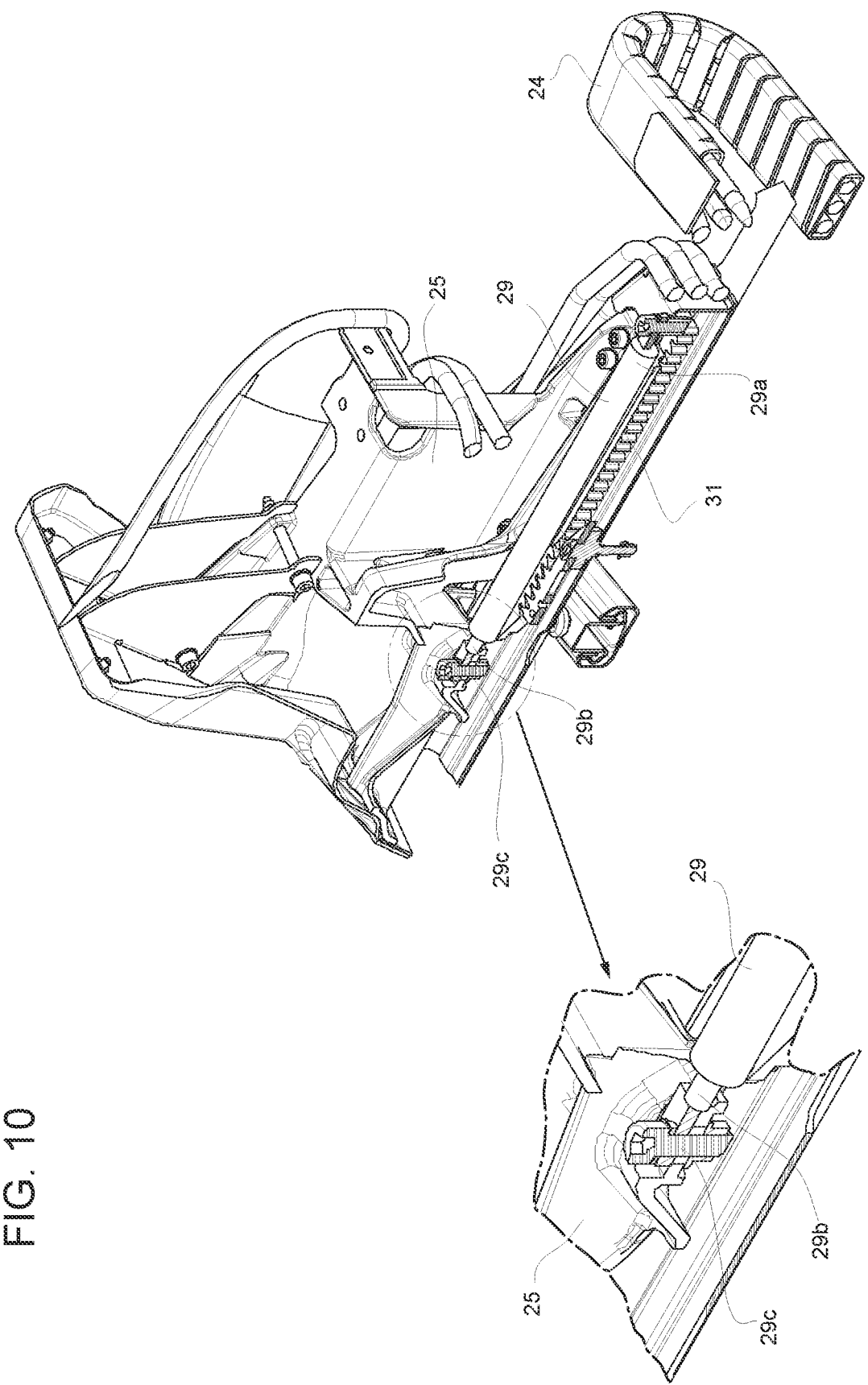
FIG. 10 is a perspective cross-section of the front portion in FIG. 6 according to a plane section indicated in FIG. 6 by the lines X-X.

The actuator device 29 has a fixed portion 29a, which is fastened or is fixed in relation to the slide 20, and a mobile portion 29b mobile in relation to the fixed portion 29a, in particular in the movement direction or, more precisely, translation direction of the base 25. The mobile portion 29b is fixed in relation to the base 25. In particular, as can be seen in FIG. 10, the mobile portion 29b is fastened to the base 25 via at least one mechanical connection element 29c of the seat assembly 10, for example a threaded element, such as a bolt.

The control unit 28 is configured to control the actuator device 29 as a function of a signal generated via a suitable control (not illustrated) of the seat assembly 10 or of the vehicle 1, such as a remote control, a button, a mobile phone, a lever, or the like, which can be activated by the driver. The control unit 28 adjusts the position of the base and, thus, in detail, of the set of pedals 13 based on the signal generated by the control, in turn corresponding to how the driver activates the control. The control may be external or internal to the vehicle 1, or even mobile, as in the case of a mobile phone or remote control.

The actuator assembly for moving the seat assembly 10 along the direction K may be configured in a similar way to the control assembly 27 just described, with the suitable adaptations that may be necessary, which can, in any case, be directly and unambiguously derived by a person skilled in the art of handling seats, in light of this description.

The seat assembly 10 preferably comprises, in addition, a releasable locking device 30 configured to releasably lock the mobility of the base 25 in relation to the slide 20, so that the base 25 is mobile when the releasable locking device is released.

Figure 7:
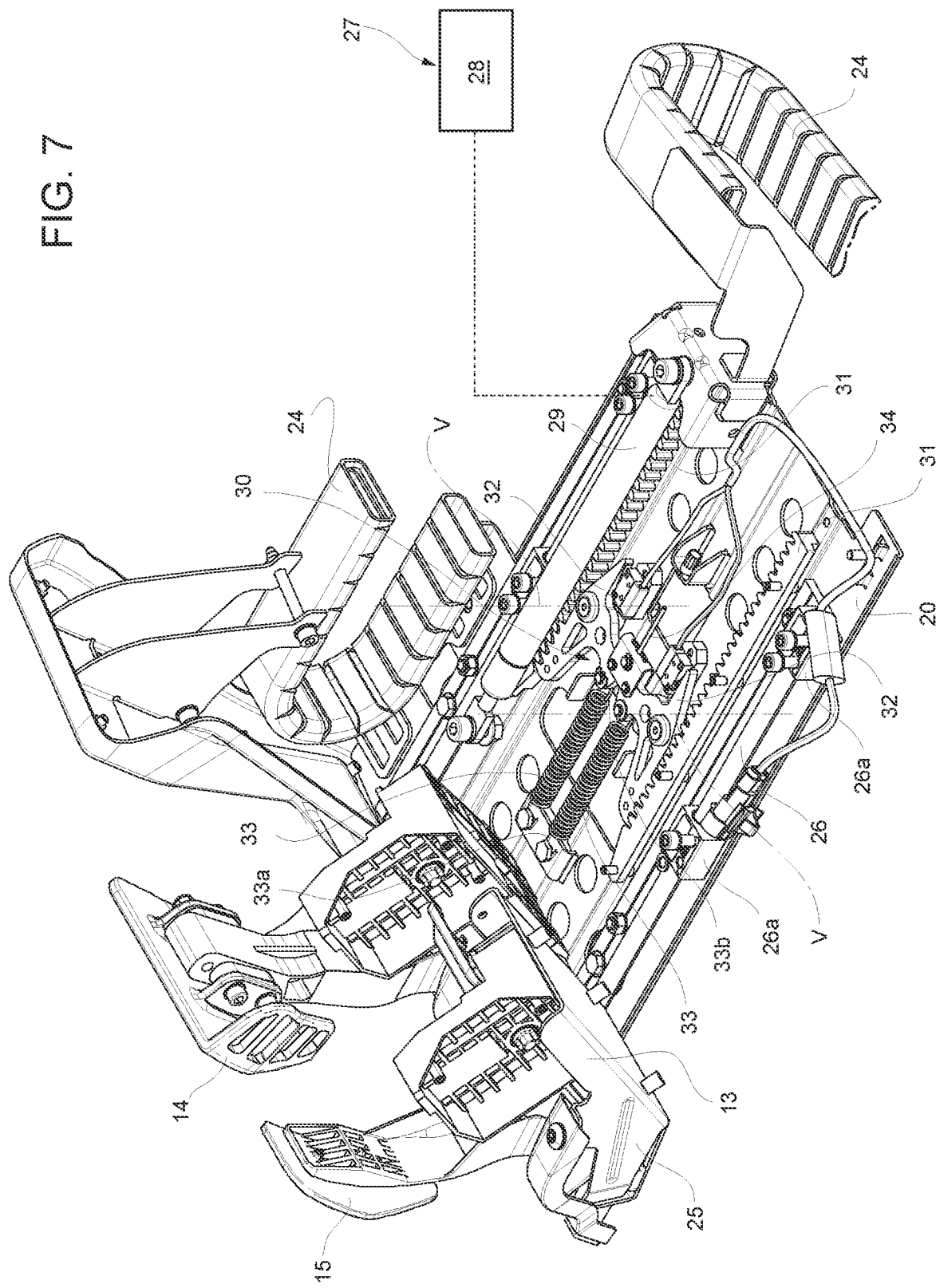
FIG. 7 illustrates the front portion of FIG. 6 in perspective with parts removed for clarity.

Specifically, the releasable locking device 30 comprises at least one rack gear 31 fixed in relation to the base 25 (FIG. 7) and a toothed engagement element 32 hinged to the slide 20, in particular directly, around a hinge axis V, in detail parallel to the axis Z, in a rotatable manner between one engaged position and a disengaged position, respectively wherein the teeth of the element 32 are engaged and disengaged with the rack gear 31.

Figure 9:
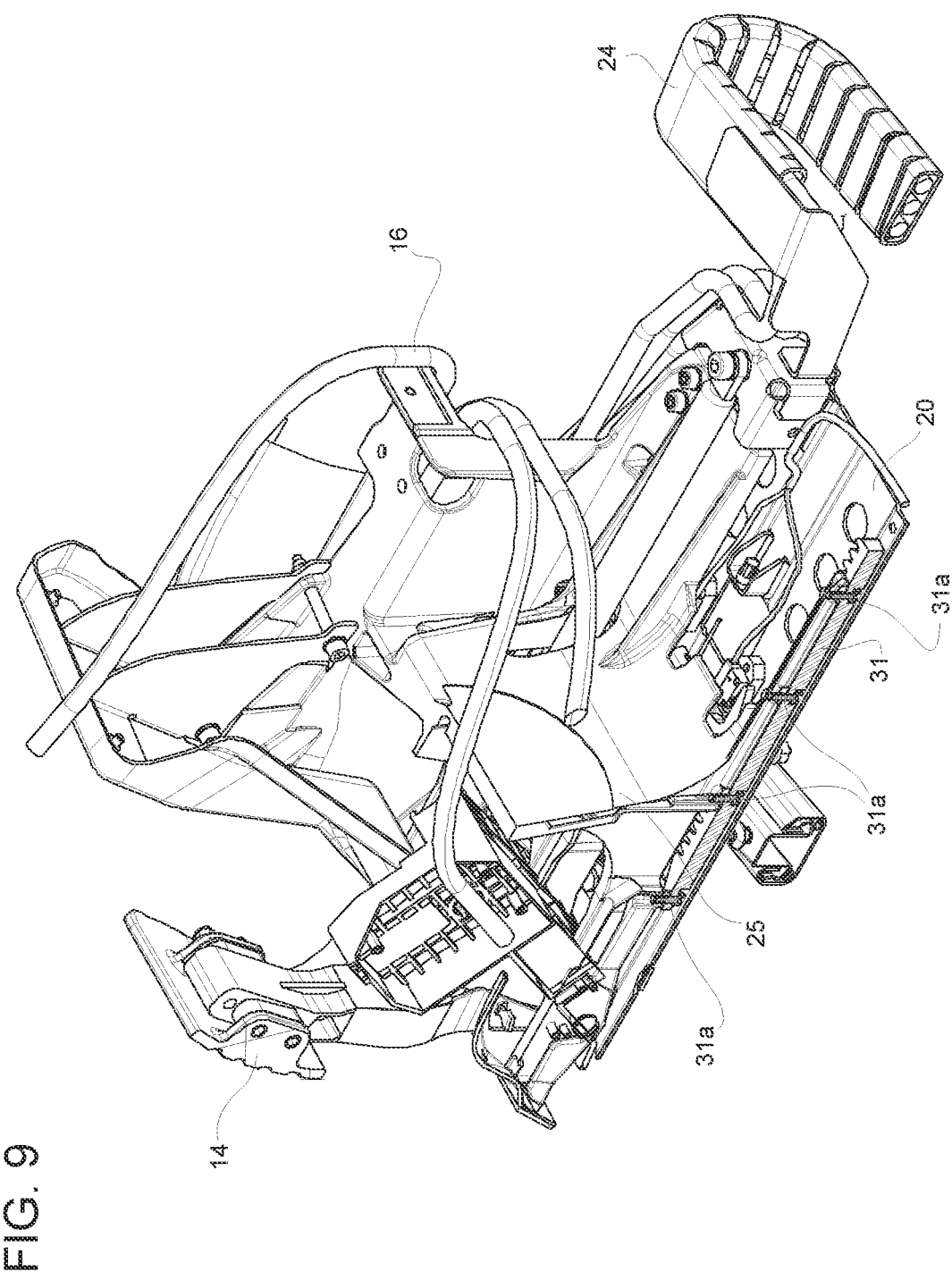
FIG. 9 is a perspective cross-section of the front portion in FIG. 6 according to a plane section indicated in FIG. 6 by the lines IX-IX.

As can be seen in FIG. 9, the rack gear 31 is fastened to the base 25 via connection elements, for example threaded elements 31a, of the seat assembly 10.

The releasable locking device 30 also comprises an elastic element 33, for example a cylindrical spring extending parallel to the axis X, configured to exert an elastic reaction on the element 32 in response to a rotation of the element 32 from the engaged position towards the disengaged position, where the elastic reaction tends to return the element 32 to the engaged position.

In particular, the elastic element 33 has one end 33a fixed in relation to the slide 20 and one end 33b fastened to the element 32 at one point located on a side opposite to the engagement zone between the teeth of the element 32 and the rack gear 31 in relation to the hinge axis V, according to the axis Y.

The elastic reaction of the elastic element 33 corresponds to a reaction torque around the axis V.

Since the element 32 is hinged to the slide 20, the same element 32 can only rotate around the axis V, but not translate in relation to the slide 20, in particular according to the axis X. Therefore, the engagement between the element 32 and the rack gear 31 hinders the translation of the base 25 fixed in relation to the rack gear 31. In fact, the rack gear 31 cannot translate when it is engaged with the element 32, since the latter cannot translate.

In addition, the releasable locking device 30 comprises a release element 34 that can be driven by the driver, for example manually, via a mechanical control or by means of an automatic device, which can, in turn, be controlled by the driver via a mechanical or electronic control, to exert a release torque on the element 32 around the axis V to rotate the element 32 from the engaged position to the disengaged position, in particular against the reaction of the elastic element 33.

For example, the release element 34 may comprise a cable or tension wire having end fixed in relation to the element 32 and one end (not illustrated) to be pulled, for example via said mechanical control or automatic device, to exert the release torque.

Said mechanical control or automatic device may be part of the seat assembly 10 or, more generally, of the vehicle 1.

With the element 32 in the disengaged position, the rack gear 31 is free to move or, more precisely, translate and, with it, the base 25 too, as a result.

In the embodiment illustrated, although this is not strictly necessary, the element 32, the elastic element 33, and the rack gear 31 are duplicated symmetrically in relation to the axis X; the release element 34 acts on both the elements 32 at the same time, since it is fastened to both the elements 32.

A releasable locking device similar in its function and/or structure to the releasable locking device 30 could, potentially, be used to releasably lock the movement of the seat assembly 10 or, more precisely, of the slide 20 along the direction K, having made the necessary adjustments, which can, in any case, be directly and unambiguously understood by a person skilled in the art of seat handling, in light of this description. Alternatively, the actuator assembly could itself exert a braking action or releasable locking one to move the seat assembly 10.

The vehicle 1 preferably comprises an additional control device 40, for example including the actuator assembly to move the seat assembly 10, configured to adjust an attitude or orientation of the rear-view mirrors 41 of the vehicle 1 as a function of the translation movement of the seat assembly 10.

More specifically, the control device 40 comprises an actuator assembly, for example a known one not illustrated for this reason, to move the rear-view mirrors 41, i.e., to change their attitude or orientation.

Figure 4:
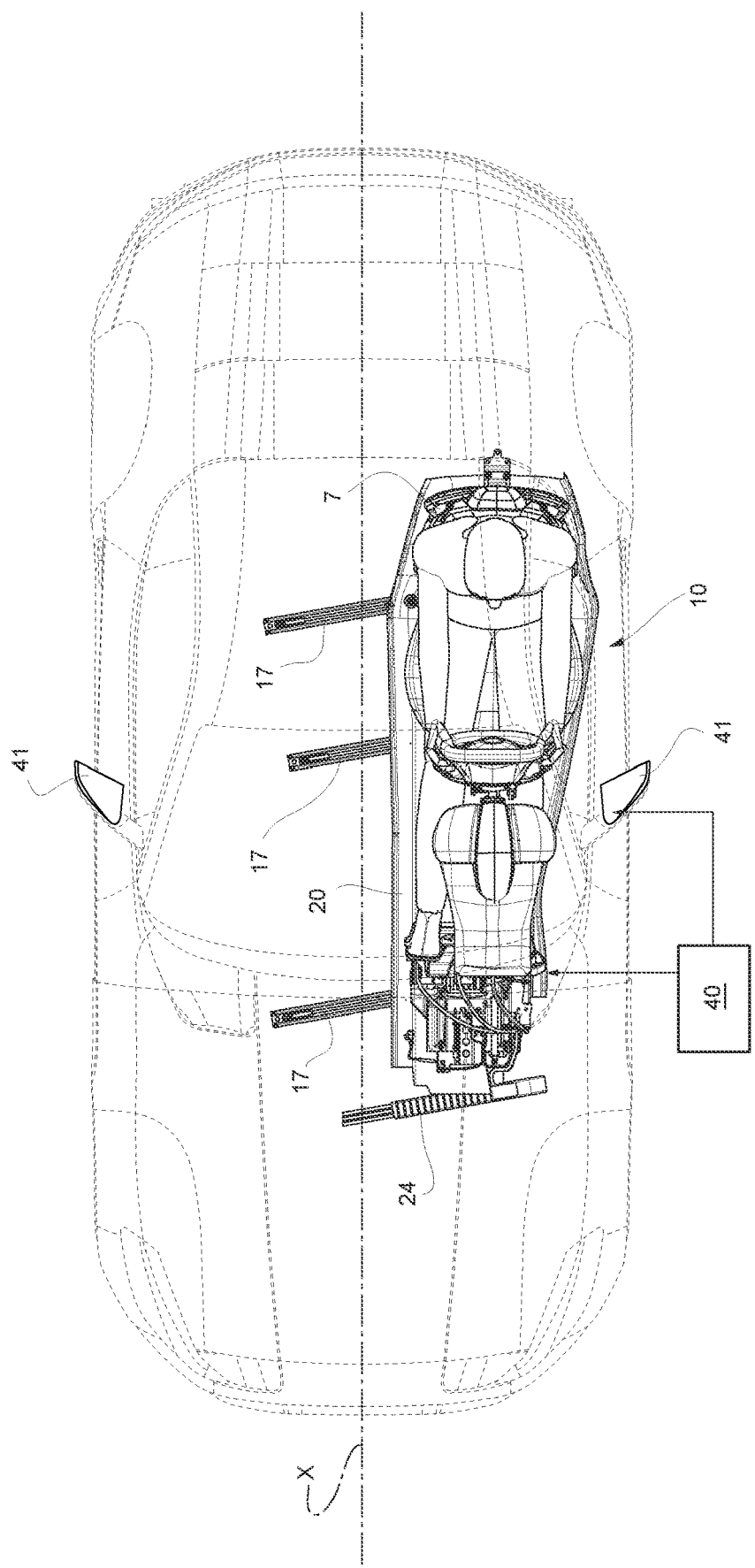
FIGS. 4 and 5 are plan views of the vehicle in FIG. 1 with the seat assembly in FIG. 2 respectively arranged according to different configurations.
Figure 5:
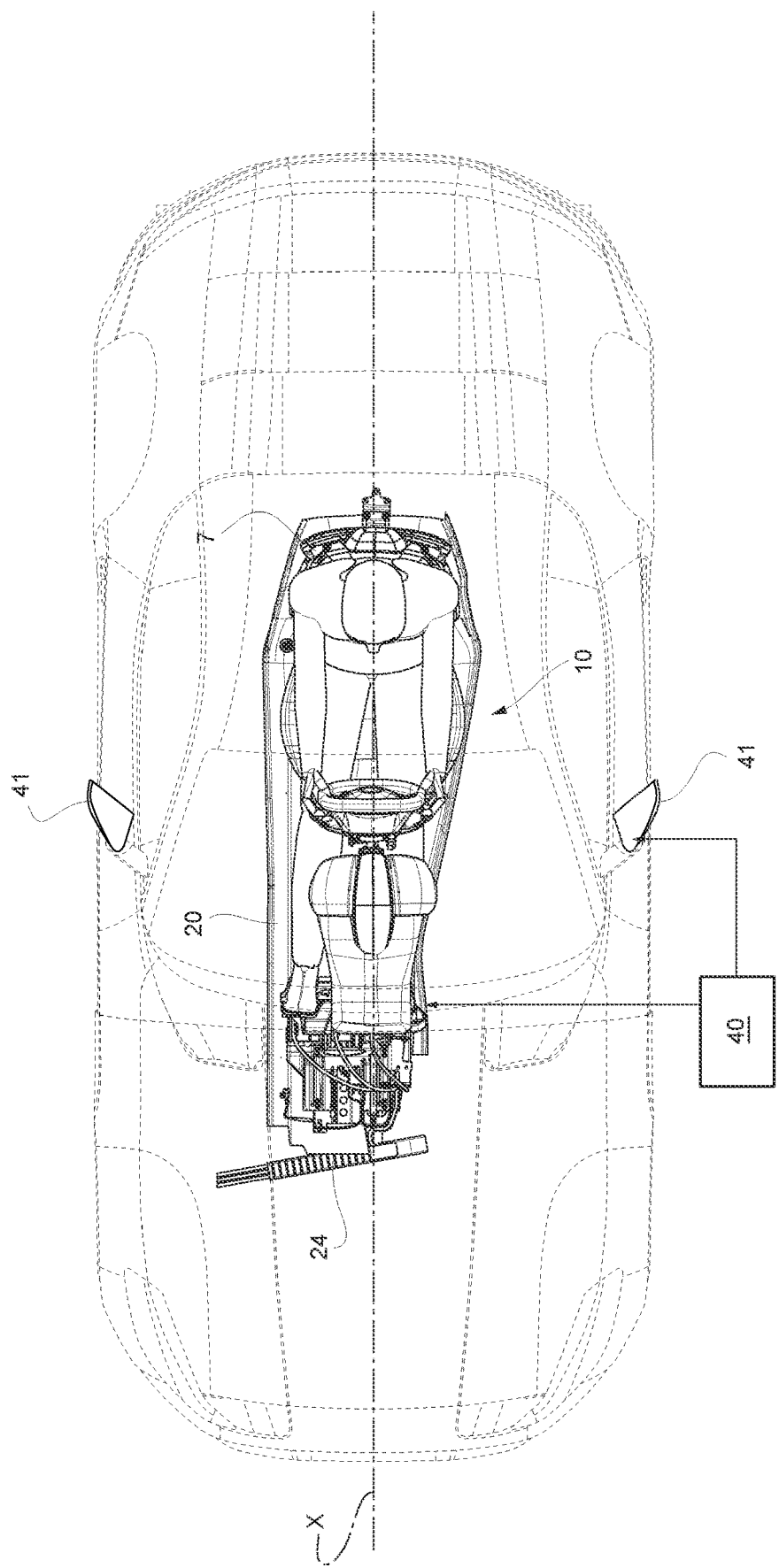
Figure 6:
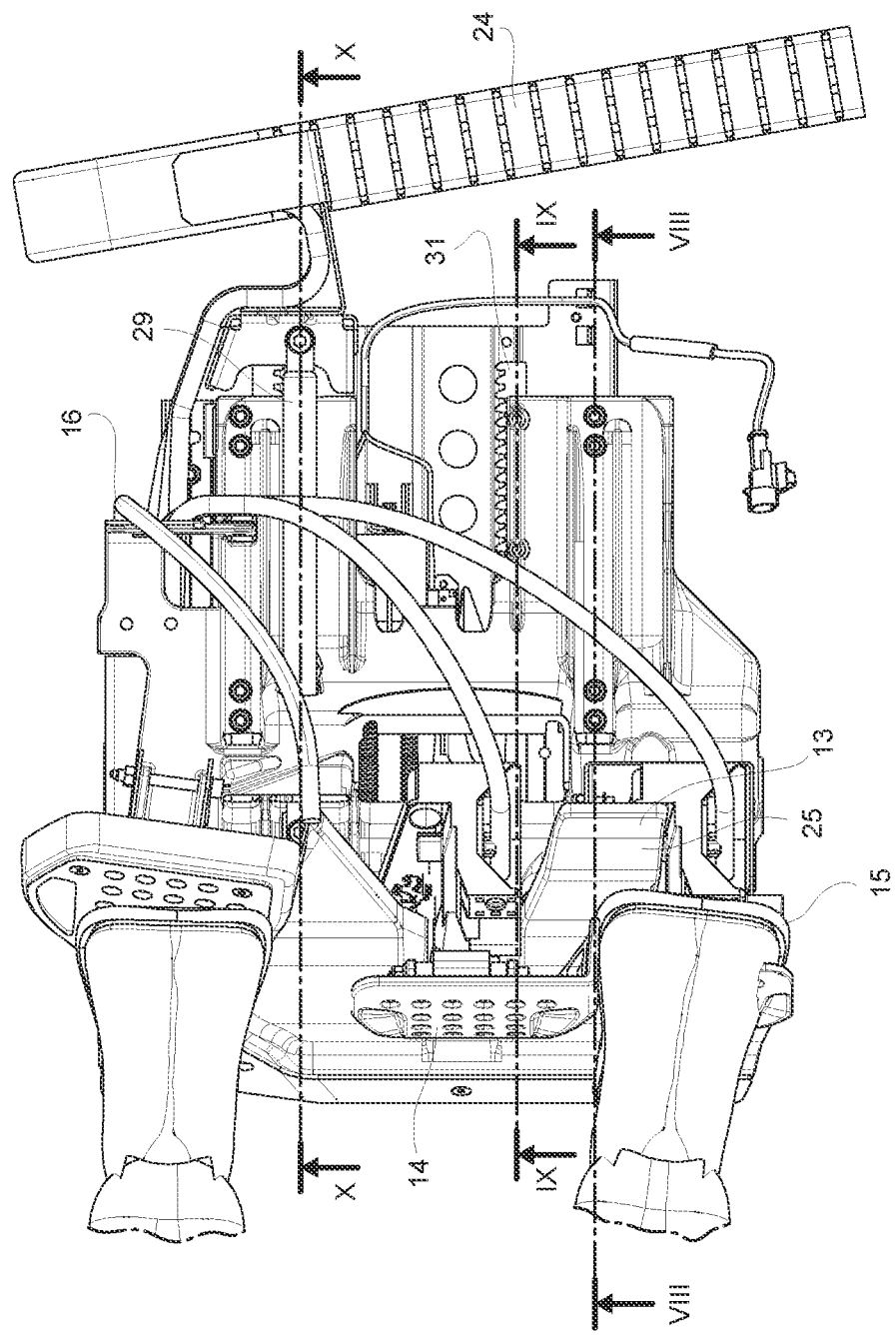
FIG. 6 is a plan view of a front portion of the seat assembly in FIG. 2.

In particular, the rear-view mirrors 41 may rotate in relation to the body 2 between a less convergent and a more convergent position in relation to the centre of the vehicle 1. In other words, in the two configurations mentioned, the rear-view mirrors 41 are turned more or less towards the centre of the vehicle 1, or wider or narrower using practical terms (FIGS. 4 and 5, respectively).

The actuator assembly for the rear-view mirrors 41 is configured to move the rear-view mirrors 41 between the two configurations mentioned.

The control device 40 has a control unit configured to coordinate the actuator assemblies for the seat assembly 10 and for the rear-view mirrors 41 automatically to adapt the configuration or attitude or orientation of the rear-view mirrors 41 to the position of the seat assembly 10 along the direction K, so that the rear view of the driver is optimal for all the positions of the seat assembly 10.

In particular, the control device 40 has the rear-view mirrors 41 in the more convergent position when the seat assembly 10 is in the less off-centre position and/or in the less convergent configuration when the seat assembly 10 is in the more off-centre position.

From the above, the advantages of the motor vehicle 1 according to the invention are clear.

For example, thanks to the invention, the vehicle 1 could be a racing vehicle with the body 2 particularly streamlined and extended in front; in this case, if the seat 7 were fixed to the floor 9 in a central, forward position, as would be optimal for a racing vehicle, the driver's access to the seat 7 via the side door 4 would be particularly complex if not actually impossible based on the profile of the body 2.

Instead, with this invention, the seat 7 may be brought alongside the side door 4, so that the driver can settle in the seat 7 entering by the door 4. Then, the driver can subsequently bring themselves into the central forward position while they are seated on the seat 7 inside the passenger compartment 3.

In addition, clearly, thanks to the invention, the vehicle 1 may even be a vehicle suitable for use on the track and on the road with the position of the seat assembly 10 adjustable, potentially continuously, along the direction K. The comfort of the driver is further increased thanks to the option of adjusting the position of the set of pedals 13 and, thus, of the pedals 14, 15, in relation to the slide 20.

Finally, it is clear that changes may be made to the motor vehicle 1 according to the invention, and variations produced thereto, that, in any case, do not depart from the scope of protection defined by the claims.

The invention claimed is:

1. A vehicle (1) comprising a body (2), and a seat assembly (10) comprising, in turn,
   a seat (7) for a driver,
   a guide (17) coupled to the body (2) and to the seat assembly (10) so as to constrain the seat assembly (10) relative to the body (2) allowing for a translation movement of the seat assembly (10) along a moving direction (K), and
   a control assembly (11, 13) to drive the vehicle (1),
   wherein the seat assembly (10) comprises a slide (20) guided by means of the guide (17) along the moving direction (K), the seat (7) being carried by the slide (20),
   wherein the control assembly (11, 13) has a base (25) carried by the slide (20),
   wherein the base (25) is coupled to the slide (20) in a selectively movable manner relative to the slide (20) according to a driving direction (X) of the vehicle (1), and
   wherein the moving direction (K) is lateral relative to the driving direction (X) of the vehicle (1), so that the base (25) is movable along the driving direction (X) relative to the seat (7) and additionally is laterally movable relative to the body (2) along the moving direction (K).

2. The vehicle according to claim 1, wherein the guide (17) and the moving direction (K) are fixed relative to the body (2).

3. The vehicle according to claim 1, wherein the seat (7) is fixed relative to the slide (20).

4. The vehicle according to claim 1, wherein the control assembly (11, 13) comprises a set (13) of pedals with one or more pedals (14, 15).

5. The vehicle according to claim 1, wherein the seat assembly (10) is movable by means of the guide device (17) between a first limit position and a second limit position, the second limit position being more forward and less off-centre relative to the first position, according to the driving direction (X) of the vehicle (1).

6. The vehicle according to claim 1, wherein the moving direction (K) is straight.

7. The vehicle according to claim 1, further comprising one or more rear-view mirrors (41) and a control device (40) configured to adjust an attitude of the rear-view mirrors (41) as a function of the translation movement of the seat assembly (10).

8. The vehicle according to claim 1, wherein the moving direction (K) is straight and oblique relative to the driving direction (X).

9. The vehicle according to claim 4, wherein the set of pedals comprises a brake pedal, an accelerator pedal, or a combination thereof, wherein the set of pedals is coupled to the base (25).

10. The vehicle according to claim 1, wherein the driving direction (X) is a roll axis of the vehicle and wherein the base (25) is arranged to translate parallel to the roll axis.

11. The vehicle according to claim 9, wherein each of the pedals in the set of pedals is configured to translate independently to each other.

* * * * *